US012722418B2

(12) United States Patent
Li

(10) Patent No.: US 12,722,418 B2
(45) Date of Patent: Sep. 1, 2026

(54) ROTARY PLATFORM DEVICE

(71) Applicant: Parric Ningbo Stationery and Gifts Mfg. Co., Ltd., Ningbo (CN)

(72) Inventor: Fuping Li, Ningbo (CN)

(73) Assignee: Parric Ningbo Stationery and Gifts Mfg. Co., Ltd., Ningbo (CN)

( * ) Notice: Subject to any disclaimer, the term of this patent is extended or adjusted under 35 U.S.C. 154(b) by 244 days.

(21) Appl. No.: 18/716,675

(22) PCT Filed: Jun. 27, 2023

(86) PCT No.: PCT/CN2023/102561
§ 371 (c)(1),
(2) Date: Jun. 5, 2024

(87) PCT Pub. No.: WO2024/002039
PCT Pub. Date: Jan. 4, 2024

(65) Prior Publication Data

US 2025/0026141 A1 Jan. 23, 2025

(30) Foreign Application Priority Data

Jun. 30, 2022 (CN) ......................... 202210766487.9

(51) Int. Cl.
*B44B 11/00* (2006.01)

(52) U.S. Cl.
CPC ........... *B44B 11/00* (2013.01); *B44B 2700/12* (2013.01)

(58) Field of Classification Search
CPC ............................ B44B 11/00; B44B 2700/12
See application file for complete search history.

(56) References Cited

U.S. PATENT DOCUMENTS 3,646,896 A * 3/1972 Derujinsky .............. A47C 3/18 5/419
2009/0045311 A1* 2/2009 Seyedin ................. F16M 11/08 248/349.1

* cited by examiner

*Primary Examiner* — Timothy A Musselman
(74) *Attorney, Agent, or Firm* — Wang Law Firm, Inc.

(57) ABSTRACT

A rotary platform device comprises a rotatable platform; a rotatable annular base disposed at the bottom of the platform. A top surface of the platform has a plane for placing objects, and the platform has an annular first groove; the annular base is disposed inside the annular first groove and is capable of rotating circumferentially along the annular first groove; a plurality of first balls is rotatably arranged at regular intervals on the annular base circumferentially along the annular base, a top portion of each first ball attaches to a top wall of the annular first groove and a side portion of each first ball attaches at least one of two side walls of the annular first groove. The rotary platform device of the present invention enables synchronous guiding and driving of the platform, such that the platform can rotate relative to the annular base more smoothly and stably.

16 Claims, 10 Drawing Sheets

ROTARY PLATFORM DEVICE

TECHNICAL FIELD OF THE INVENTION

The present invention relates to a field of hand tools, and in particular to a rotary platform device.

BACKGROUND OF THE INVENTION

Handcraft is an interesting and artistic leisure activity, and carving is one of them, such as paper carving, sculpture, etc. Handcraft enthusiasts use carving tools to cut or carve various patterns and designs on a medium such as paper, cloth, etc. and match same with the color of the medium to present special visual effects, and the various patterns and designs cut or carved by means of such cutting or carving can be displayed through windows or venues or used for decoration and arrangement, and even framed for collection.

Generally, when a person uses carving tools to cut a medium such as paper, cloth, etc. on a cutting mat, since the cutting mat is fixed, people need to adjust the wrist to cut various pattern lines. For complex and fine pattern lines, the cutting is neither accurate nor inconvenient and has troublesome during operations. In order to solve this problem, a Chinese patent application CN203126328U (application No.: ZL201220622877.0) discloses a multifunctional process auxiliary rotating disc, which comprises a base, a rotating base and a mat; a shaft being pivoted to the rotating base centers on a top surface of the base, the base has a plurality of opposite ball cylinder columns on the surface of the base, each ball cylinder column has a ball protruding from the top surface of the base, and a top portion of each ball is in contact with an inner bottom surface of the rotating base; a shaft portion corresponding to the shaft of the base centers on the inner bottom surface of the rotating base, and the shaft portion is used for the rotating base to be pivotably connected to the shaft of the base; and the rotating base has the mat on the top surface of the rotating base. By using the multifunctional auxiliary rotating disc of this patent, when a user has rotation requirements such as an angle adjustment or arc adjustment during operation, the angle can be changed simply by directly rotating the rotating base of the auxiliary rotating disc without the need to move the hand of the user. However, the rotation of the rotating base of this patent is only completed by means of contact between the top surfaces of the balls and the inner bottom surface of the rotating base, which leads to unstable rotation of the rotating base and further affect the accuracy of carving.

SUMMARY OF THE INVENTION

It is a first object of the present invention to provide a rotary platform device which rotates smoothly and stably.

It is a second object of the present invention to provide a rotary platform device which is convenient to use.

For achieving at least one of the two objects, the rotary platform device comprises a rotatable platform having a top surface and a bottom; a rotatable annular base disposed at the bottom of the platform; wherein, the top surface of the platform has a plane for placing objects, and the platform has an annular first groove facing downward at the bottom of the platform, the annular first groove has a top wall and two side walls; the annular base is disposed inside the annular first groove and is capable of rotating circumferentially along the annular first groove; a plurality of first balls each having a top portion and a side portion is rotatably arranged at regular intervals on the annular base circumferentially along the annular base, the top portion of each first ball attaches to the top wall of the annular first groove and the side portion of each first ball attaches at least one of the two side walls of the annular first groove.

Preferably, the annular base has a bottom surface, the bottom surface of the annular base is lower than a lowest edge of the bottom of the platform. The bottom surface of the annular base is in contact with a placement flat surface, such that the platform can rotate relative to the annular base more stably; moreover, when placed in an inverted state, the rotary platform device can still enable a rotation of a medium (for example, a wooden plate, glass, etc.) to be processed on the bottom surface of the annular base (at this time, the platform does not move, and the annular base rotates relative to the platform), such that the rotary platform device has a plurality of usage modes and is more convenient to use.

Preferably, the annular base has an inner annular wall, the plurality of first balls is located at the inner annular wall of the annular base, and the side portion of each ball attaches to the side wall of the annular first groove adjacent to a center of the platform. In this way, the effect of a centrifugal force on contact force between the side portion of each first ball and the side wall of the annular first groove during the rotation can be reduced, such that the side portion of the first ball can drive the platform to rotate more stably and smoothly.

Preferably, a plurality of second balls each having a top portion and a side portion is arranged at regular intervals on the annular base circumferentially along the annular base, the top portion of each second ball attaches to the top wall of the annular first groove. Thus, support points between the platform and the annular base can be added to improve force balance and reduce a rotational friction force, such that the platform can rotate more smoothly.

Preferably, each second ball and each first ball are arranged at a transposition interval on the annular base. In this way, upward rotational driving force and lateral rotational driving force acting on the annular first groove can be distributed more uniformly, such that the platform rotates more smoothly and stably.

Preferably, the top portion of each second ball attaches to a middle of a radial width of the top wall of the annular first groove. In this way, the second balls and the first balls cooperate with each other, such that the upward rotational driving forces acting on the annular first groove can be distributed uniformly in the radial width of the annular first groove, and the platform can further rotate smoothly and stably.

Preferably, the annular base has a plurality of cylindrical first mounting bases arranged at regular intervals at the inner annular wall of the annular base, each first mounting base has a mounting hole facing upward for receiving the corresponding first ball which is rotatably disposed inside the first mounting base, each first mounting base has an opening facing towards a central axis of the annular base, such that the side portion of the corresponding first ball protrudes from the inner annular wall of the annular base. Thus, stable pivot connection between the first balls and the annular base can be realized; moreover, the side portion of each first ball is smoothly in contact with the side wall of the first groove due to the opening of each first mounting base.

Preferably, the annular base has a recessed mounting guide rail, the plurality of first mounting bases is arranged in the mounting guide rail, and the opening of each first mounting base is located at an inner side of the mounting guide rail, thereby further enabling stable mounting of the first balls on the annular base.

Preferably, the mounting guide rail has a plurality of cylindrical second mounting bases arranged at regular intervals at a bottom wall of the mounting guide rail, each second mounting base has a mounting hole facing upward for receiving a corresponding second ball which is rotatably disposed inside the second mounting base, thereby enabling stable mounting of the second balls on the annular base.

Preferably, the top portion of each first ball and the top portion of each second ball are on a same plane, driving the platform to rotate more stably.

Preferably, the mounting guide rail has a guide edge protruded from an outer side wall of the mounting guide rail circumferentially along the mounting guide rail, a plurality of guide blocks is located on the side wall of the annular first groove away from the center of the platform, the guide blocks are capable of restricting vertical movement of the guide edge, each guide block slides below the guide edge circumferentially along the mounting guide rail. The platform can rotate relative to the annular base more stably by means of the guide edge; moreover, the guide blocks cooperate with the first balls to firmly embed the annular base in the annular first groove of the platform.

Preferably, a plurality of first anti-slip pads is located at regular intervals at the bottom surface of the annular base, preventing the bottom surface of the annular base from sliding relative to the placement flat surface (for example, a desk top, etc.) during the rotation of the platform.

Preferably, the plane of the platform has a recess for placing a mat, convenient for the mat (for example, a cutting mat, etc.) to be placed on the platform.

Preferably, the recess has an inner bottom surface, and a second anti-slip pad is located at the inner bottom surface of the recess, thereby preventing the mat from sliding relative to the inner bottom surface of the recess during the rotation of the platform.

Preferably, the platform has a first edge extending outward from an edge of the recess at regular intervals or extending outward from the top of the recess horizontally along a circumferential direction of the recess, a plurality of third anti-slip pads is located on a top surface of the first edge. In this way, a large hard medium or other large hard flat plate serving as a working surface can also be placed on the first edge, thereby further adding the usage modes of the rotary platform device, and a user can use the rotary platform device more conveniently according to requirements; by providing the third anti-slip pads, when a large hard medium or a hard working flat surface is placed on the first edge for operation, the medium can be prevented from sliding relative to the top surface of the first edge, and when the rotary platform device is used in an inverted state, the third anti-slip pads can prevent the first edge from sliding relative to the placement flat surface.

Preferably, the platform has a disc shape and the top surface of the platform is a plane for placing objects. Thus, the overall appearance of the rotary platform device is aesthetic, and the platform is convenient to rotate.

Preferably, the platform has the annular first groove at the bottom of the platform, and the bottom surface of the annular base is lower than a bottom of the annular first groove, such that the structure of the platform is simple, and the assembly and disassembly of the platform and the annular base is convenient.

Compared with the prior art, the advantages of the present invention are: in the present invention, the plurality of first balls is arranged at regular intervals on the annular base circumferentially along the annular base, the top portion of each first ball attaches to the top wall of the annular first groove and the side portion of each first ball attaches at least one of the two side walls of the annular first groove. In this way, during the rotation of the platform, the top portion and the side portion of each first ball are in contact with the corresponding walls of the annular first groove of the platform at the same time, thereby enabling synchronous guiding and driving of the platform, such that the platform can rotate relative to the annular base more smoothly and stably, and further, the medium (paper, cloth, etc.) to be processed placed on the plane of the platform can be rotated more smoothly and stably, thereby effectively preventing the medium from falling off the plane of the platform.

DETAILED DESCRIPTION OF THE INVENTION

The present invention will be further described below in detail by embodiments with reference to the accompanying drawings.

It should be noted that in the description of the present invention, the terms “center”, “longitudinally”, “horizontally”, “length”, “width”, “thickness”, “up, down”, “front, back”, “left, right”, “vertical”, “parallel”, “top, bottom”, “inside, outside”, “clockwise”, “counterclockwise”, “axial direction”, “radial direction”, “circumferential direction”, etc. to describe a direction or position based on the accompanying drawings are only used for describe the present invention and simplify the description, instead of indicating that devices or elements must have particular orientation or must be constructed and operated in a particular orientation. Since the embodiments disclosed by the present invention can be set in different directions, these terms indicating directions are only used as explanations and should not be used as restrictions. For example, the verbs “up”, “down” should not be limited to the direction opposite or consistent with the gravity. In addition, a feature defined as “first” or “second” may explicitly or implicitly comprises one or more such features.

Figure 1:
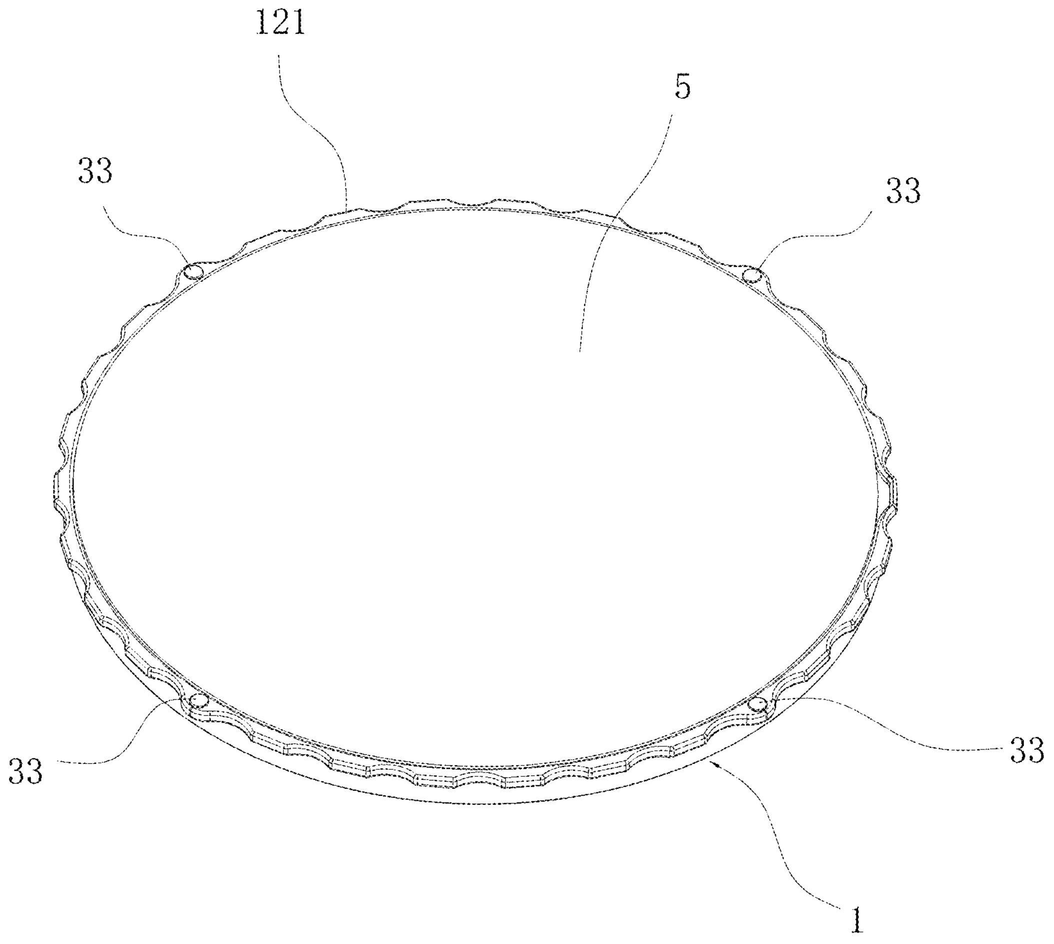
FIG. 1 is a perspective view of a rotary platform device according to an embodiment of the present invention.
Figure 2:
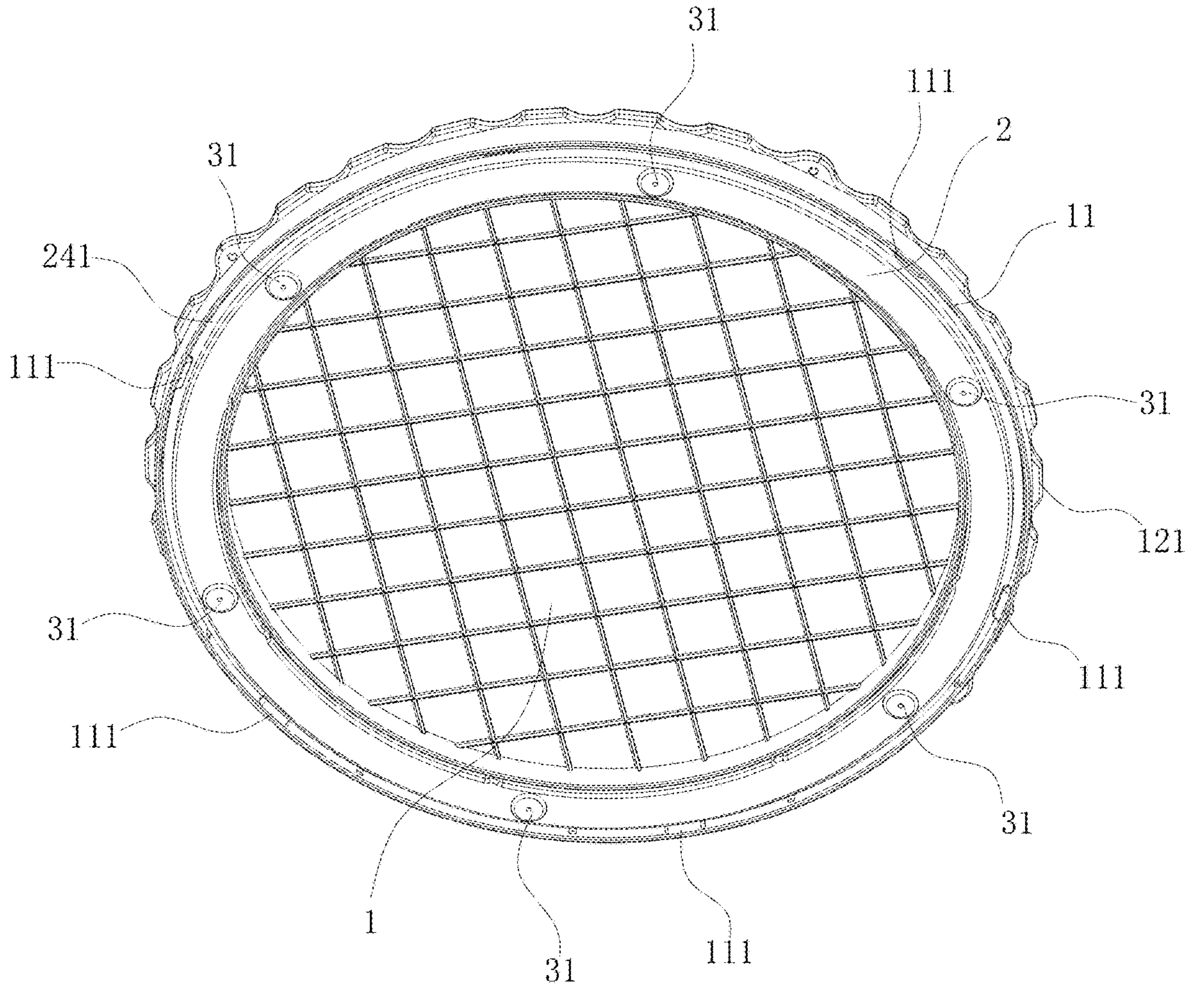
FIG. 2 is a perspective view of the FIG. 1 seen from a bottom of the rotary platform device.
Figure 3:
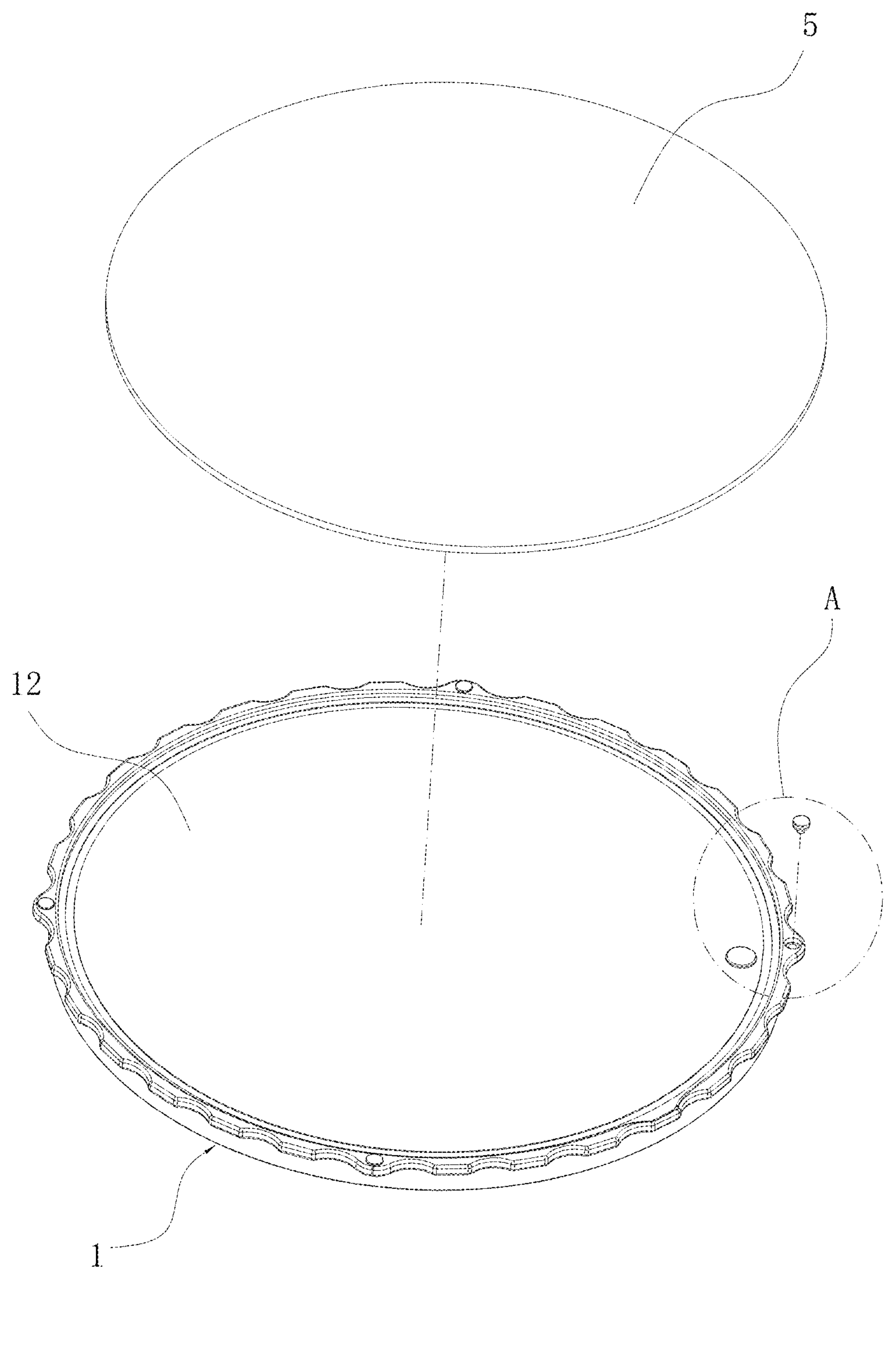
FIG. 3 is an exploded view of the rotary platform device according to the embodiment of the present invention.
Figure 4:
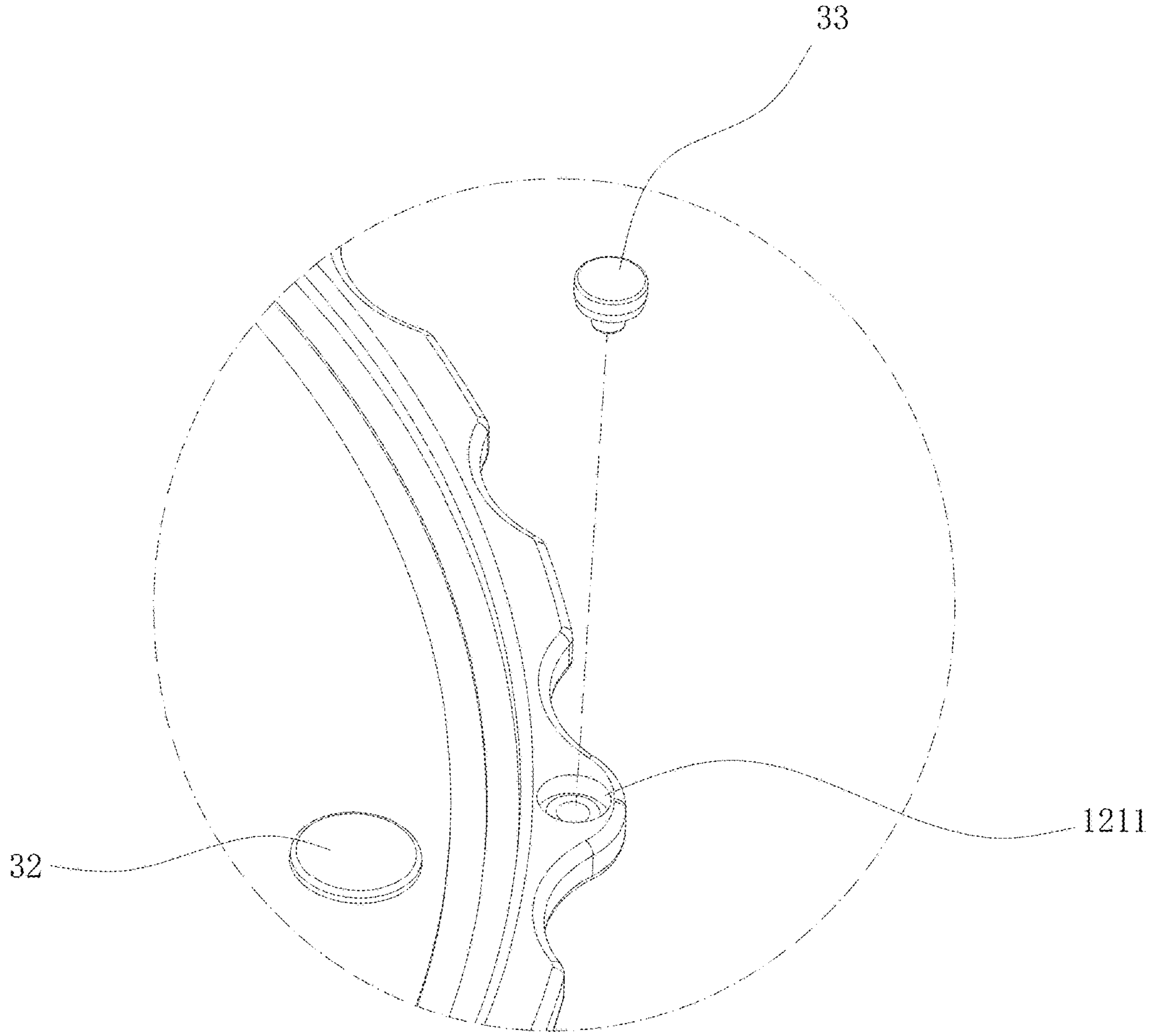
FIG. 4 is an enlarged view of Part-A in FIG. 3.
Figure 5:
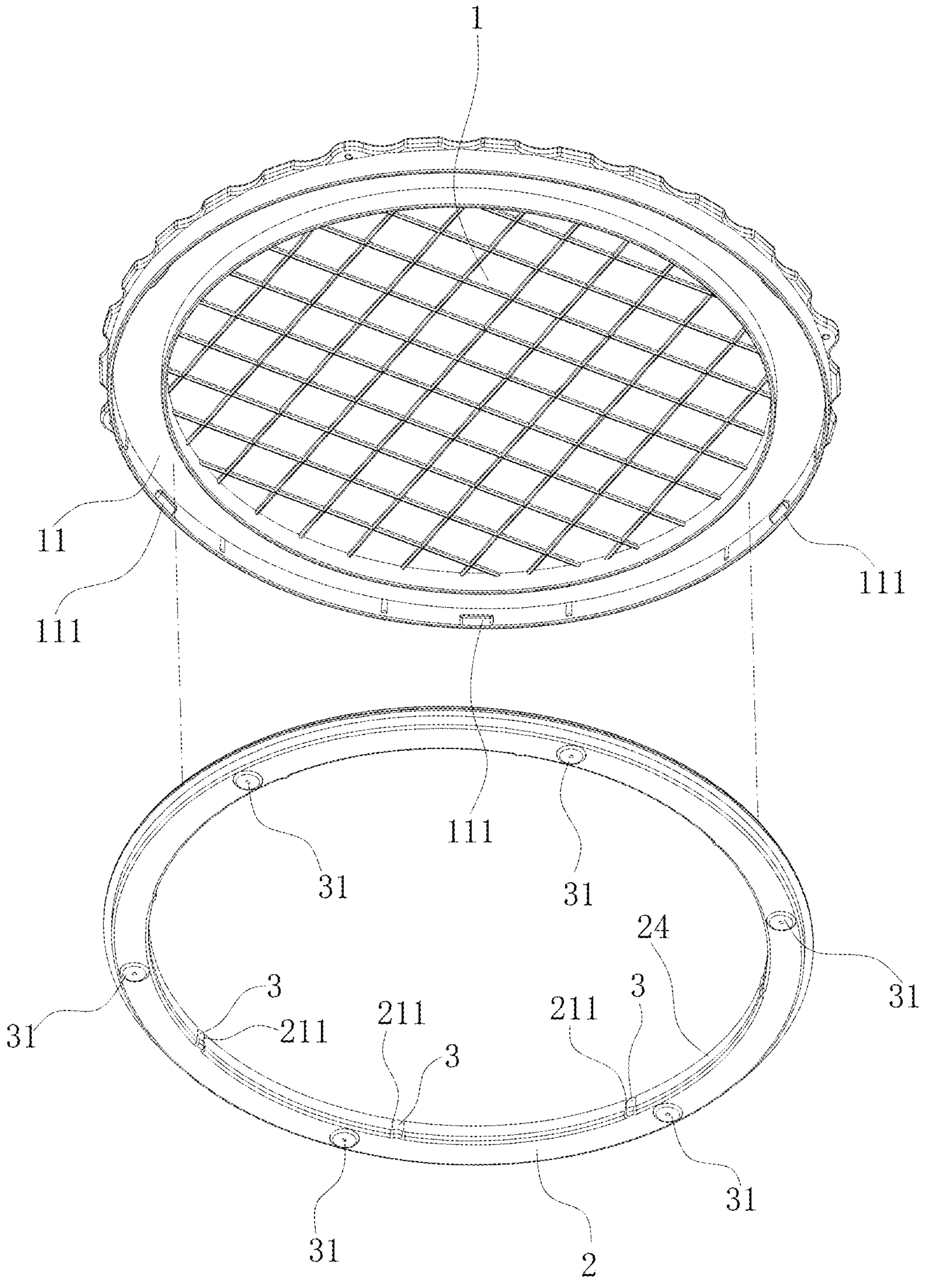
FIG. 5 is another exploded view of the rotary platform device according to the embodiment of the present invention.
Figure 6:
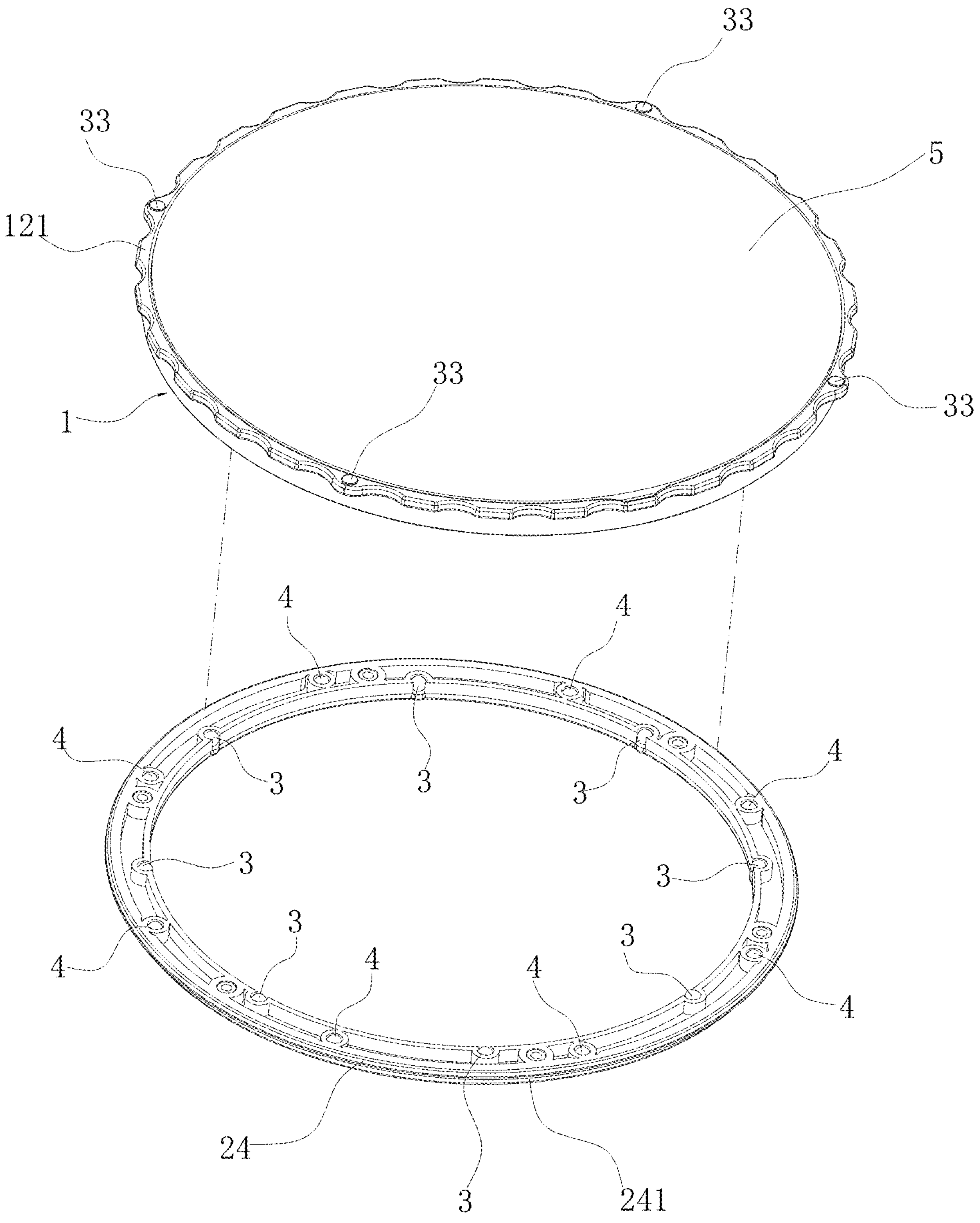
FIG. 6 is an exploded view of the FIG. 5 seen from a top of the rotary platform device.
Figure 7:
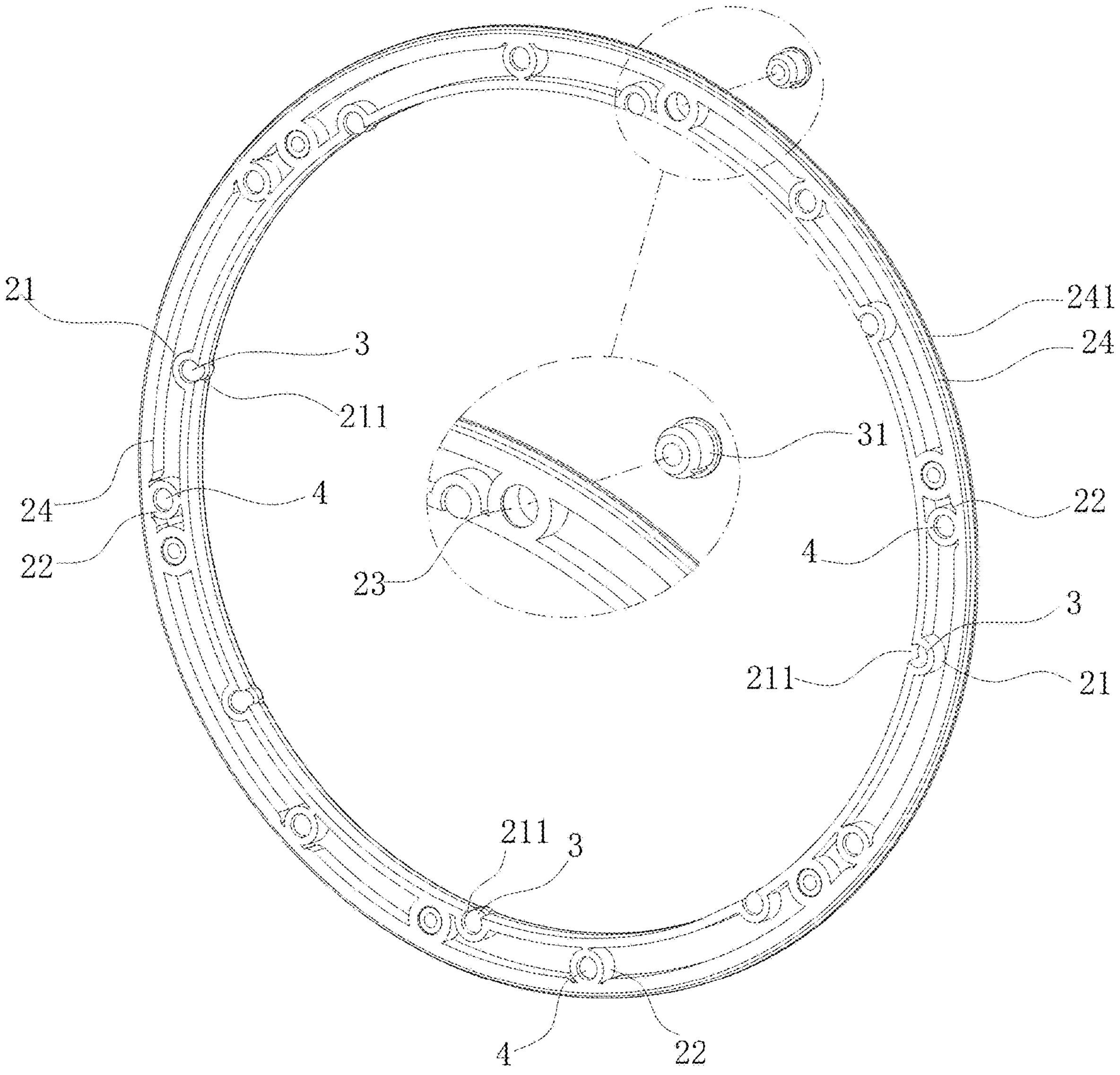
FIG. 7 is a perspective view of an annular base with partially exploded according to the embodiment of the present invention.
Figure 8:
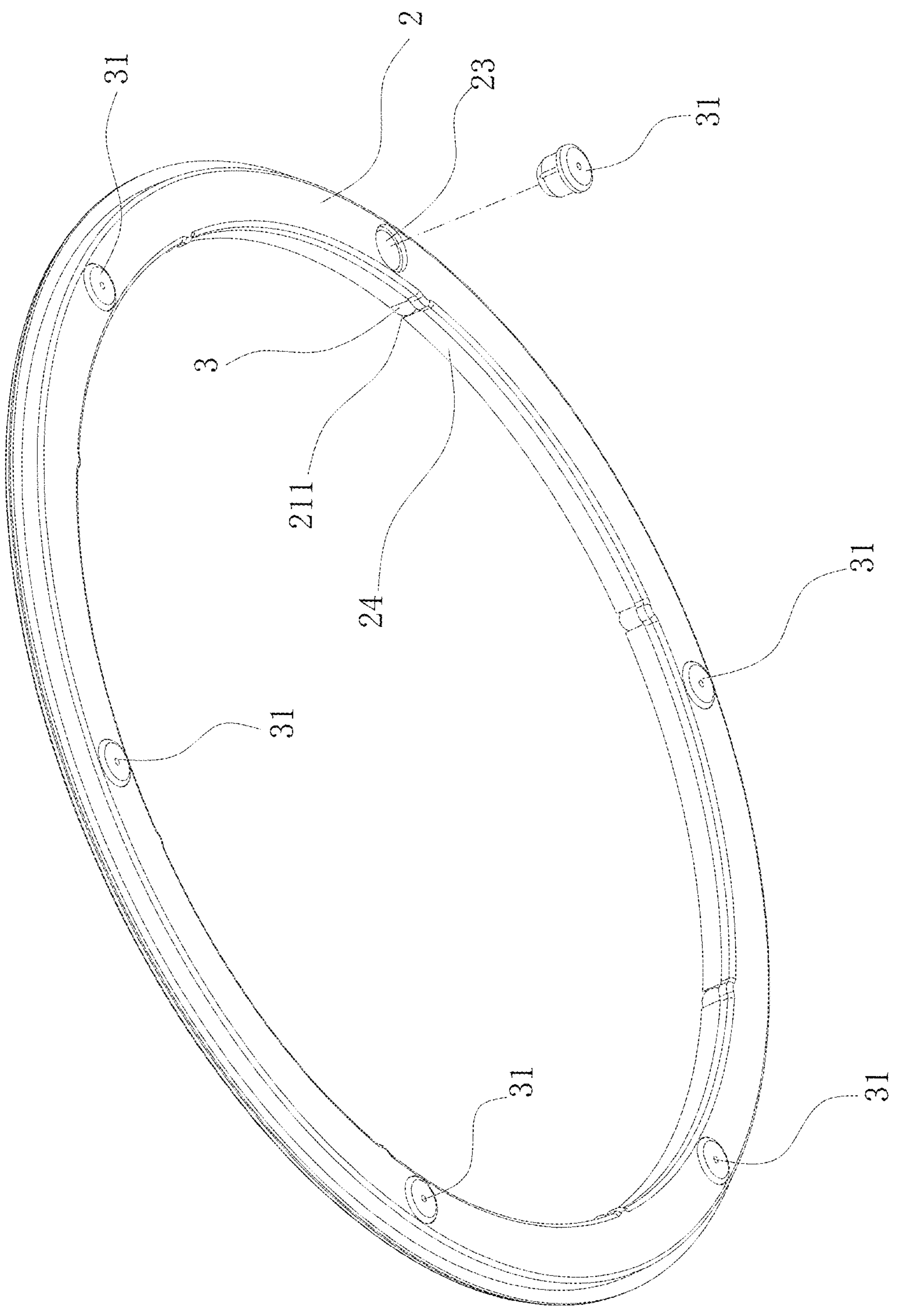
FIG. 8 is another perspective view of the FIG. 7 seen from a bottom of the annular base.
Figure 9:
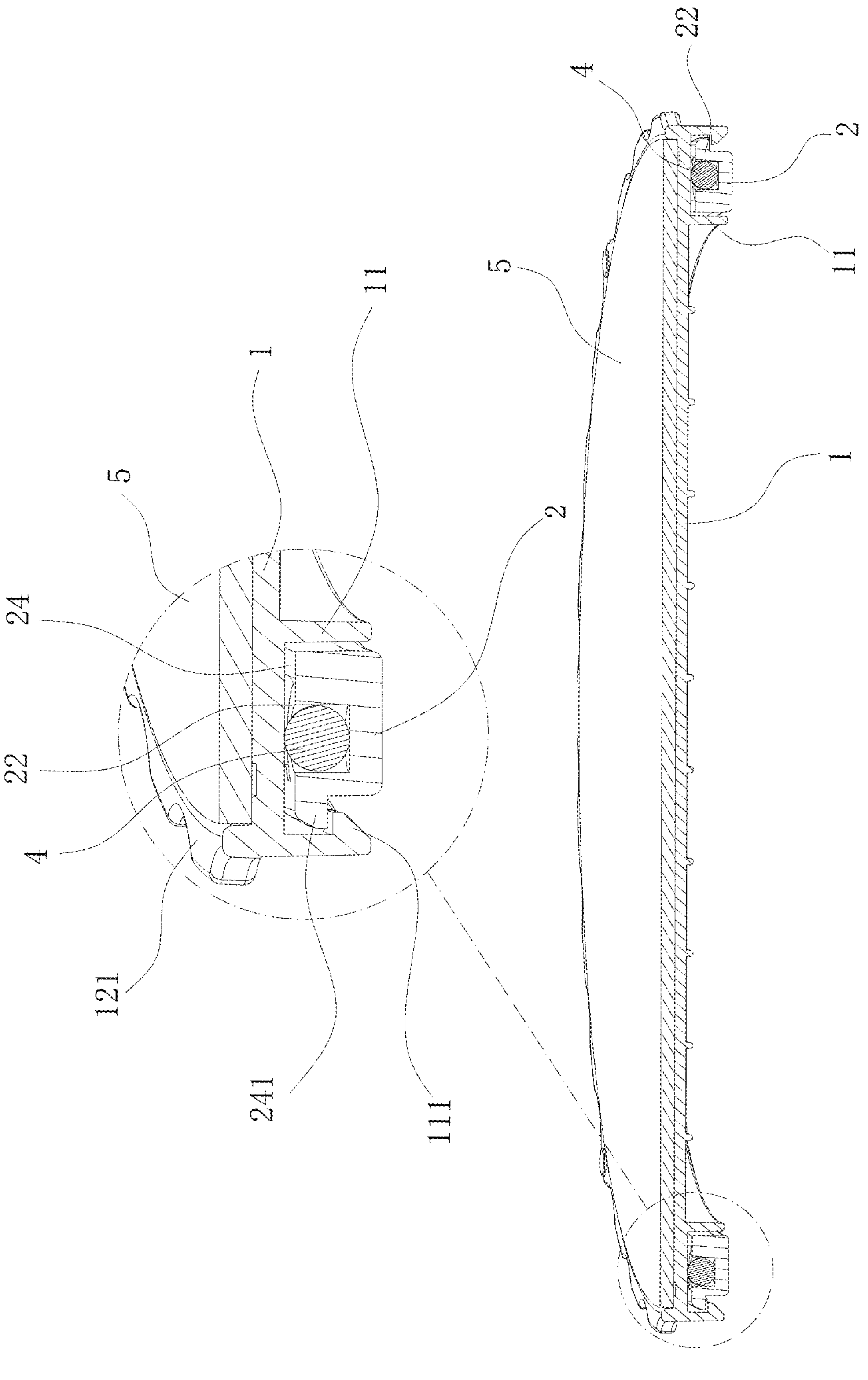
FIG. 9 is a sectional view of the rotary platform device according to the embodiment of the present invention.
Figure 10:
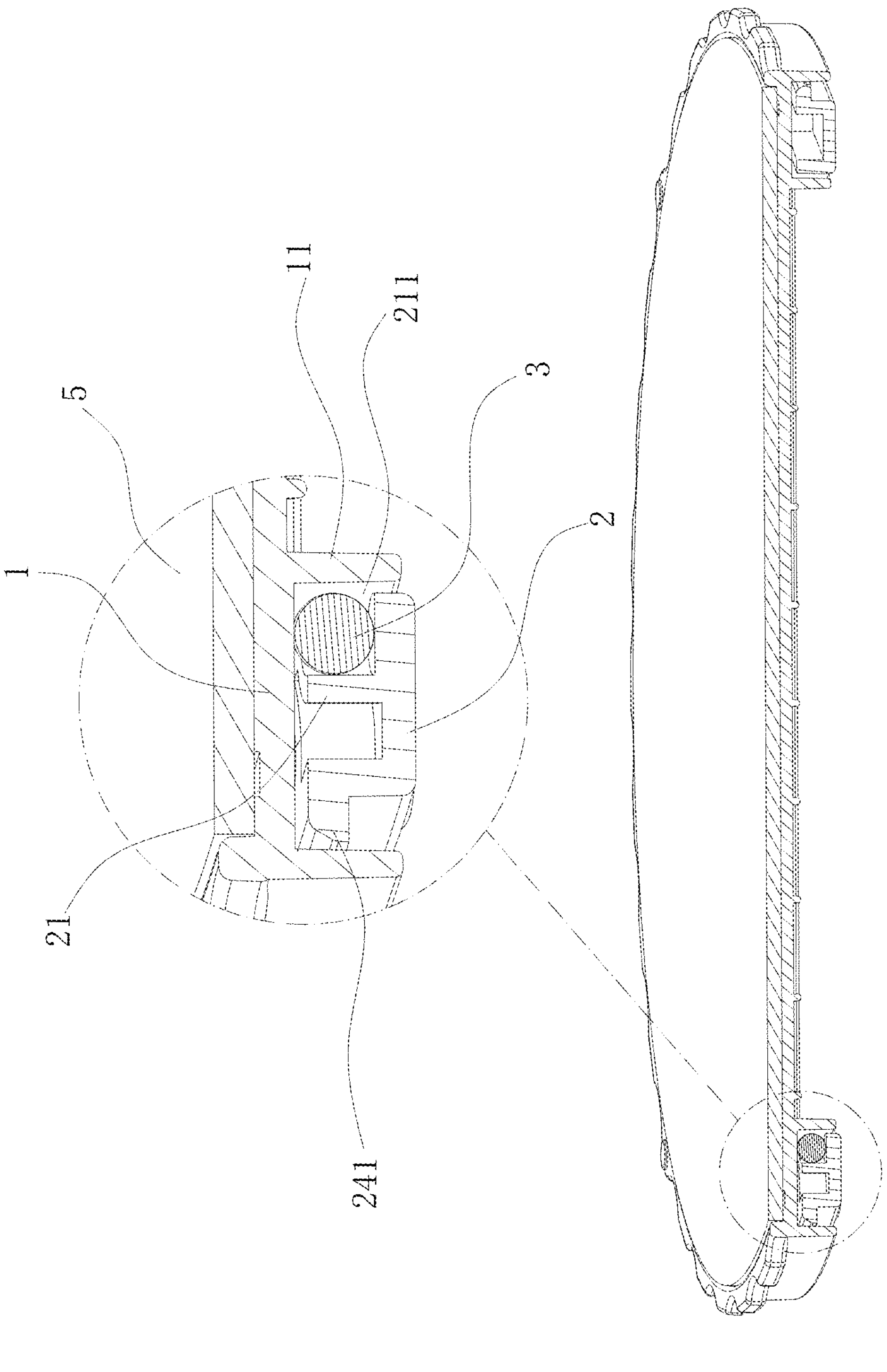
FIG. 10 is another sectional view of the rotary platform device according to the embodiment of the present invention.

FIGS. 1-10 show a preferred embodiment of a rotary platform device of the present invention. The rotary platform device comprises a rotatable platform 1 having a top surface and a bottom, and a rotatable annular base 2 disposed at the bottom of the platform 1. The top surface of the platform 1 has a plane for placing objects, and the platform 1 has an annular first groove 11 facing downward at the bottom of the platform 1, the annular first groove 11 has a top wall and two side walls; the annular base 2 is disposed inside the annular first groove 11 and is capable of rotating circumferentially along the annular first groove 11; a plurality of first balls 3 each having a top portion and a side portion is rotatably arranged at regular intervals on the annular base 2 circumferentially along the annular base 2, the top portion of each first ball 3 attaches to the top wall of the annular first groove 11 and the side portion of each first ball 3 attaches at least one of the two side walls of the annular first groove 11. In this way, during rotation of the platform 1 relative to the annular base 2, the top portion and the side portion of each first ball 3 are respectively in contact with the corresponding walls of the annular first groove 11 of the platform 1, thereby enabling synchronous guiding and driving of the platform 1, such that the platform 1 can rotate relative to the annular base 2 more smoothly and stably, and further, the medium (paper, cloth, etc.) to be processed placed on the plane of the platform 1 can be rotated more smoothly and stably, thereby effectively preventing the medium from falling off the plane of the platform 1.

The shape of the platform 1 is not limited in one type. In this embodiment, preferably, the platform 1 has a disc shape, and the top surface of the platform 1 is a plane for placing objects. The disc-shaped rotating platform 1 enables the overall appearance of the rotary platform device to be aesthetic, and the platform is convenient to rotate. The rotary platform device of the present invention is mainly used as an auxiliary tool for handcraft operations such as cutting and carving, and certainly, other handcraft operations such as handcrafts, clay sculpture, etc. can also be performed on the rotary platform device. The medium to be processed can be directly placed on the plane of the platform 1, or the medium to be processed can be placed on a mat 5 after the mat 5 is placed.

Further, the annular base 2 has a bottom surface, the bottom surface of the annular base 2 is lower than a lowest edge of the bottom of the platform 1. In this way, the bottom surface of the annular base 2 is in contact with a placement flat surface, such that the platform can rotate relative to the annular base 2 more stably (at this time, the annular base 2 does not move, and the platform 1 rotates relative to the annular base 2); moreover, when placed in an inverted state, the rotary platform device can still enable a rotation of a medium (for example, a wooden plate, a glass plate, etc.) to be processed on the bottom surface of the annular base 2 (at this time, the platform 1 does not move, and the annular base 2 rotates relative to the platform 1), such that the rotary platform device has a plurality of usage modes and is more convenient to use. Likewise, when the rotary platform device is placed in an inverted state, the medium to be processed can be directly placed on the bottom surface of the annular base 2, or the medium to be processed is placed after the mat 5 is placed on the bottom surface of the annular base 2. In this embodiment, the platform 1 has the annular first groove 11 at the bottom of the platform 1, and the bottom surface of the annular base 2 is lower than a bottom of the annular first groove 11, such that the structure of the platform 1 is simple, and the operation of assembly and disassembly of the platform 1 and the annular base 2 is easy.

Further, the annular base 2 has an inner annular wall, the plurality of first balls 3 is located at the inner annular wall of the annular base 2, and the side portion of each first ball 3 attaches to the side wall of the annular first groove 11 adjacent to a center of the platform 1. In this way, the effect of a centrifugal force on contact force between the side portion of each first ball 3 and the side wall of the annular first groove 11 during the rotation can be reduced, such that the side portion of the first ball 3 can drive the platform 1 to rotate more stably and smoothly. In this embodiment, the annular base 2 has a plurality of cylindrical first mounting bases 21 arranged at regular intervals at the inner annular wall of the annular base 2, each first mounting base 21 has a mounting hole facing upward for receiving the corresponding first ball 3 which is rotatably disposed inside the first mounting base 21, each first mounting base 21 has an opening 211 facing towards a central axis of the annular base 2, such that the side portion of the corresponding first ball 3 protrudes from the inner annular wall of the annular base 2. Thus, stable pivot connection between the first balls 3 and the annular base 2 can be realized; moreover, the side portion of each first ball 3 is smoothly in contact with the side wall of the annular first groove 11 due to the opening of each first mounting base 21.

Further, a plurality of second balls 4 each having a top portion and a side portion is arranged at regular intervals on the annular base 2 circumferentially along the annular base 2, the top portion of each second ball 4 attaches to the top wall of the annular first groove 11. Thus, support points between the platform and the annular base 2 can be added to improve force balance and reduce a rotational friction force, such that the platform can rotate more smoothly. Further, each second ball 4 and each first ball 3 are arranged at a transposition interval on the annular base 2. In this way, upward rotational driving force and lateral rotational driving force acting on the annular first groove 11 can be distributed more uniformly, such that the platform 1 rotates more smoothly and stably. Moreover, preferably, the top portion of each first ball 3 and the top portion of each second ball 4 are on a same plane, driving the platform 1 to rotate more stably.

In this embodiment, the annular base 2 has a recessed mounting guide rail 24, the plurality of first mounting bases 21 is arranged in the mounting guide rail 24, and the opening 211 of each first mounting base 21 is located at an inner side of the mounting guide rail 24, thereby further enabling stable mounting of the plurality of first balls 3 on the annular base 2. Moreover, the mounting guide rail 24 has a plurality of cylindrical second mounting bases 22 arranged at regular intervals at a bottom wall of the mounting guide rail 24, each second mounting base 22 has a mounting hole facing upward for receiving a corresponding second ball 4 which is rotatably disposed inside the second mounting base 22, enabling stable mounting of the second balls 4 on the annular base 2. Further, the mounting guide rail 24 has a guide edge 241 protruded from an outer side wall of the mounting guide rail 24 circumferentially along the mounting guide rail 24, a plurality of guide blocks 111 is located on the side wall of the annular first groove 11 away from the center of the platform 1, the guide blocks 111 are capable of restricting vertical movement of the guide edge 241, each guide block 111 slides below the guide edge 241 circumferentially along the mounting guide rail 24. The platform 1 can rotate relative to the annular base 2 more stably by means of the guide edge 241; moreover, the guide blocks 111 cooperate with the first balls 3 to firmly embed the annular base 2 in the annular first groove 11 of the platform 1.

Further, the plane of the platform 1 has a recess 12 for placing a mat 5, convenient for the mat 5 (for example, a cutting mat, etc.) to be placed on the platform 1. In this embodiment, the recess 12 has a circular shape and matches the size of the mat 5 received therein. Still further, the platform 1 has a first edge 121 extending outward from an edge of the recess 12 at regular intervals or extending outward from the top of the recess 12 horizontally along a circumferential direction of the recess 12. In this way, the medium to be processed can also be placed on the first edge 121, thereby further adding the usage modes of the rotary platform device, and a user can use the rotary platform device more conveniently according to requirements. Likewise, the medium to be processed can be directly placed on the first edge 121, or the medium to be processed can be placed after the mat 5 is placed on the first edge 121. Preferably, a plurality of third anti-slip pads 33 are located at regular intervals on a top surface of the first edge 121 circumferentially along the recess 12. By providing the third anti-slip pads 33, when the medium to be processed is placed on the first edge 121 for operation, the medium can be prevented from sliding relative to the top surface of the first edge 121, and when the rotary platform device is used in an inverted state, the third anti-slip pads 33 can prevent the first edge 121 from sliding relative to the placement flat surface. Specifically, in this embodiment, the first edge 121 has a plurality of third mounting grooves 1211 arranged at regular intervals at the first edge 121 circumferentially along the recess 12 and each third mounting groove 1211 receives the corresponding third anti-slip pad 33 which is embedded in the third mounting groove 1211. Further, the recess 12 has an inner bottom surface, and a second anti-slip pad 32 is located at the inner bottom surface of the recess 12, thereby preventing the mat 5 from sliding relative to the inner bottom surface of the recess 12 during the rotation of the platform 1.

In addition, in this embodiment, a plurality of first anti-slip pads 31 is located at regular intervals at the bottom surface of the annular base 2, so as to prevent the bottom surface of the annular base 2 from sliding relative to the placement flat surface (for example, a desk top, etc) during the rotation of the platform 1. Specifically, the annular base 2 has a plurality of first mounting grooves 23 arranged at regular intervals at the bottom surface of the annular base 2, each first mounting groove 23 receives the corresponding first anti-slip pad 31, the walls of each first mounting groove 23 protrude from the bottom wall of the mounting guide rail 24, and each first anti-slip pad 31 is located in the corresponding first mounting groove 23.

The invention claimed is:

1. A rotary platform device, comprising:
- a rotatable platform (1) having a top surface and a bottom;
- a rotatable annular base (2) disposed at the bottom of the platform (1);
- wherein,
- the top surface of the platform (1) has a plane for placing objects, and the platform (1) has an annular first groove (11) facing downward at the bottom of the platform (1), the annular first groove (11) has a top wall and two side walls;
- the annular base (2) is disposed inside the annular first groove (11) and is capable of rotating circumferentially along the annular first groove (11);
- a plurality of first balls (3) each having a top portion and a side portion is rotatably arranged at regular intervals on the annular base (2) circumferentially along the annular base (2), the top portion of each first ball (3) attaches to the top wall of the annular first groove (11) and the side portion of each first ball (3) attaches at least one of the two side walls of the annular first groove (11); and
- a plurality of second balls (4) each having a top portion and a side portion is arranged at regular intervals on the annular base (2) circumferentially along the annular base (2), the top portion of each second ball (4) attaches to the top wall of the annular first groove (11).

2. The rotary platform device of claim 1, wherein the annular base (2) has a bottom surface, the bottom surface of the annular base (2) is lower than a lowest edge of the bottom of the platform (1).

3. The rotary platform device of claim 1, wherein the annular base (2) has an inner annular wall, the plurality of first balls (3) is located at the inner annular wall of the annular base (2), and the side portion of each first ball (3) attaches to the side wall of the annular first groove (11) adjacent to a center of the platform (1).

4. The rotary platform device of claim 1, wherein each second ball (4) and each first ball (3) are arranged at a transposition interval on the annular base (2).

5. The rotary platform device of claim 1, wherein the top portion of each second ball (4) attaches to a middle of a radial width of the top wall of the annular first groove (11).

6. The rotary platform device of claim 1, wherein the annular base (2) has a plurality of cylindrical first mounting bases (21) arranged at regular intervals at the inner annular wall of the annular base (2), each first mounting base (21) has a mounting hole facing upward for receiving the corresponding first ball (3) which is rotatably disposed inside the first mounting base (21), each first mounting base (21) has an opening (211) facing towards a central axis of the annular base (2), such that the side portion of the corresponding first ball (3) protrudes from the inner annular wall of the annular base (2).

7. The rotary platform device of claim 6, wherein the annular base (2) has a recessed mounting guide rail (24), the plurality of first mounting bases (21) is arranged in the mounting guide rail (24), and the opening (211) of each first mounting base (21) is located at an inner side of the mounting guide rail (24).

8. The rotary platform device of claim 7, wherein the mounting guide rail (24) has a plurality of cylindrical second mounting bases (22) arranged at regular intervals at a bottom wall of the mounting guide rail (24), each second mounting base (22) has a mounting hole facing upward for receiving a corresponding second ball (4) which is rotatably disposed inside the second mounting base (22).

9. The rotary platform device of claim 8, wherein the top portion of each first ball (3) and the top portion of each second ball (4) are on a same plane.

10. The rotary platform device of claim 7, wherein the mounting guide rail (24) has a guide edge (241) protruded from an outer side wall of the mounting guide rail (24) circumferentially along the mounting guide rail (24), a plurality of guide blocks (111) is located on the side wall of the annular first groove (11) away from the center of the platform (1), the guide blocks (111) are capable of restricting vertical movement of the guide edge (241), each guide block (111) slides below the guide edge (241) circumferentially along the mounting guide rail (24).

11. The rotary platform device of claim 1, wherein a plurality of first anti-slip pads (31) is located at regular intervals at the bottom surface of the annular base (2).

12. The rotary platform device of claim 1, wherein the plane of the platform (1) has a recess (12) for placing a mat (5).

13. The rotary platform device of claim 12, wherein the recess (12) has an inner bottom surface, and a second anti-slip pad (32) is located at the inner bottom surface of the recess (12).

14. The rotary platform device of claim 12, wherein the platform (1) has a first edge (121) extending outward from an edge of the recess (12) at regular intervals or extending outward from the top of the recess (12) horizontally along a circumferential direction of the recess (12), a plurality of third anti-slip pads (33) is located on a top surface of the first edge (121).

15. The rotary platform device of claim 1, wherein the platform (1) has a disc shape and the top surface of the platform (1) is a plane for placing objects.

16. The rotary platform device of claim 15, wherein the platform (1) has the annular first groove (11) at the bottom of the platform (1), and the bottom surface of the annular base (2) is lower than a bottom of the annular first groove (11).

* * * * *